(12) United States Patent
Cherubini et al.

(10) Patent No.: US 11,052,484 B2
(45) Date of Patent: Jul. 6, 2021

(54) SYSTEM FOR PROCESSING A DRIED FLUID SAMPLE SUBSTRATE AND METHOD THEREFOR

(71) Applicant: Roche Molecular Systems, Inc., Pleasanton, CA (US)

(72) Inventors: Claudio Cherubini, Cham (CH); Andreas Drechsler, Baar (CH); Reto Huesser, Cham (CH); Emad Sarofim, Hagendorn (CH)

(73) Assignee: Roche Molecular Systems, Inc., Pleasanton, CA (US)

( * ) Notice: Subject to any disclaimer, the term of this patent is extended or adjusted under 35 U.S.C. 154(b) by 499 days.

(21) Appl. No.: 15/982,317

(22) Filed: May 17, 2018

(65) Prior Publication Data

US 2018/0333806 A1 Nov. 22, 2018

(30) Foreign Application Priority Data

May 17, 2017 (EP) ..................................... 17000846

(51) Int. Cl.
*B23K 26/16* (2006.01)
*B23K 26/12* (2014.01)
(Continued)

(52) U.S. Cl.
CPC .......... *B23K 26/16* (2013.01); *B23K 26/0853* (2013.01); *B23K 26/0876* (2013.01);
(Continued)

(58) Field of Classification Search
CPC .. B23K 26/16; B23K 26/702; B23K 26/0853; B23K 26/0876; B23K 26/127;
(Continued)

(56) References Cited

U.S. PATENT DOCUMENTS 9,266,109 B2 2/2016 Howell et al.
2007/0051710 A1 3/2007 Odanaka et al.
(Continued)

FOREIGN PATENT DOCUMENTS

EP 17000846 10/2017
WO 2009068749 A2 6/2009
WO 2009068749 A3 6/2009

*Primary Examiner* — Phuong T Nguyen
(74) *Attorney, Agent, or Firm* — Eric Grant Lee

(57) ABSTRACT

According to the present invention, a system (1; 1') for processing at least one substrate (2) containing a dried fluid sample (21) is provided, the system (1; 1') comprising a support (12) configured to position the substrate (2), a laser device (3) for directing a laser beam (31) to the substrate (2), configured to cut at least one area of the substrate (2) containing the dried fluid sample (21) by means of the laser beam (31), a container holder (4; 4') configured to hold and position a container (5) for receiving the cut area, the container holder (4; 4') being arranged below the substrate (2), and an extraction subsystem (6) for extracting fume and/or dust generated when laser cutting the substrate (2), wherein the extraction subsystem (6) consists of at least two extraction components (61, 62) sandwiching the substrate (2) there between. Furthermore, a method for automated processing at least one substrate (2) containing a dried fluid (21) sample by means of such a system (1; 1') is provided.

15 Claims, 12 Drawing Sheets

(51) Int. Cl.
  *B23K 37/04* (2006.01)
  *G01N 1/04* (2006.01)
  *B23K 26/08* (2014.01)
  *B23K 26/38* (2014.01)
  *G01N 1/28* (2006.01)
  *B23K 26/70* (2014.01)
  *B23K 103/00* (2006.01)

(52) U.S. Cl.
  CPC ............ *B23K 26/127* (2013.01); *B23K 26/38* (2013.01); *B23K 26/702* (2015.10); *B23K 37/0408* (2013.01); *B23K 37/0443* (2013.01); *G01N 1/04* (2013.01); *G01N 1/286* (2013.01); *B23K 2103/32* (2018.08); *G01N 2001/2886* (2013.01)

(58) Field of Classification Search
  CPC ................ B23K 26/38; B23K 37/0408; B23K 37/0443; B23K 2103/32; G01N 1/04; G01N 1/286; G01N 2001/2886
  USPC ............. 219/121.61, 121.68, 121.7, 121.71, 219/121.72, 121.84, 121.86
  See application file for complete search history.

(56) References Cited

U.S. PATENT DOCUMENTS

2013/0034118 A1* 2/2013 Bragin ............... H01S 3/036
  372/59
2015/0040688 A1* 2/2015 Murphy ............. B23K 26/16
  73/863

* cited by examiner

SYSTEM FOR PROCESSING A DRIED FLUID SAMPLE SUBSTRATE AND METHOD THEREFOR

CROSS REFERENCE TO RELATED APPLICATIONS

This Application claims the benefit of priority of European Patent Application No. EP 17000846.0, filed May 17, 2017, which is incorporated herein by reference in its entirety.

FIELD OF THE INVENTION

The present invention relates to a system and method for processing dried fluid samples applied to a substrate, such as a sample carrier, e.g. a DBS (Dried Blood Spot testing) card or the like, which can particularly comprise dried biological sample liquids containing e.g. DNA or viral RNA, such as blood, saliva and the like. In particular, the present invention relates to a system for processing at least one substrate containing a dried fluid sample and a method for automated processing a dried fluid sample substrate by means of such system, i.e. the automated processing of sample carriers containing biological materials in dried fluid samples, wherein fractions of substrate sheets carrying the dried biological materials are cut off from the respective sample carrier for further processing. For such further processing, these sheet fractions, for example in the form of circular spots, can be conveyed to analytical equipment after cutting, for example for DNA analysis or metabolic analysis of the dried biological sample, which conveying means for conveying the sheet fractions to the analytical equipment and which analytical equipment used for analyzing the cut sheet fractions, for analyzing matter present therein, or for analyzing analytes extracted therefrom can be part of the system itself.

BACKGROUND OF THE INVENTION

In the field of diagnostic technology, DBS analysis has been known for quite some time now as a simple way of collecting, shipping and storing dried fluid samples, such as blood, saliva or the like. In the course of DBS analysis, a sample is collected by applying drops of sample fluid, in the case of a blood sample typically obtained from venipuncture of a human or animal, to an absorbent substrate, such as a DBS card, a filter paper or other suitable porous material which is able to absorb the fluid to be examined. Thereby, the liquid sample usually saturates the substrate and is then air-dried for a period of time long enough to form at least one circularly dried fluid spot on the substrate. The spot-containing substrate can then be stored in a vessel such as a plastic container, which can be easily transported as needed, and particularly without being frozen, or sometimes even without the need of being cooled or the like.

Due to the small amount of required sample, typical fields of applications for DBS technology are, for example, newborn screening, where only a very small amount of blood is generally available, and therapeutic drug monitoring or also regulated substance abuse testing, since drawing of small blood samples can be performed by the patients themselves in a minimally invasive way. Furthermore, due to their transport stability, DBS cards containing dried samples are more easily transportable than common anti-coagulated liquid blood samples in respective receptacles and, thus, can be shipped, for example, via standard mail delivery over long distances. Therefore, DBS technology can especially be advantageous for use in resource-poor regions, but can also be used to improve efficiency of usually complex and administrative cumbersome clinical trial studies, or even for "home application", such as in the course of personalized healthcare analysis or regulated substance abuse testing.

For analysis, one or more regions containing the sample fluid to be examined, i.e. one or more sample regions, are usually separated from the DBS card and the one or more pieces that have been separated can then be conveyed—for analysis- to sample extraction in order to be able to extract the desired analyte such as pharmaceutical compounds, genetic materials, etc. from the dried sample, and to introduce analyte samples into one or more sample wells of e.g. a microtitration plate or some other well or microwell container or a tube, for analysis. In the past, the described necessity of separation of the sample regions from the DBS card was considered to be a major drawback of DBS technology since sample extraction from a large number of DBS cards in the course of, for example, clinical trials with multiple participants was very tedious and required many manually performed process steps, such as manually separating the respective sample regions from the DBS cards, for example by cutting the same from the DBS cards by hand, and depositing the respective cut DBS card pieces into sample containers or the like for further processing. Due to this particular disadvantage, and also due to several further problems as described in further detail below, DBS technology has vanished from laboratories in the past.

However, due to technological developments in recent years, the handling of such card samples and, thus, the practicability of DBS technology has experienced significant improvement, and its advantages compared to the conventional collection and analysis of blood or plasma samples, such as the need for lower blood volumes, easier shipping conditions and simplified storage requirements of the dried samples came back into reach. All-in-all, the respective simplification of the blood collection process and transmittal thereof, and the thus significant reduction of overall costs has lead to the fact that the importance of DBS analysis is growing again, to an extent such that the use of DBS technology is increasing worldwide.

As mentioned above, the separation of the samples from a carrier in an effective way used to be—and sometimes still is—a major drawback of DBS technology. So far, several different methods have been applied for separating the dried blood spots from the DBS substrate. As already mentioned above, the spots can be cut manually from the substrate; this technique, however, is rather cumbersome and laborious and often leads to carry-over, i.e. the presence of material from a prior sample that appears in subsequent samples, which usually compromises the quality of data. Also, due to the proximity of the human cutter to the DBS substrate to be cut, the cutter himself can accidentally compromise a spot to be cut with his or her own DNA. Thus, manual cutting of spots from DBS substrate is usually highly problematic.

In order to avoid human contact with the DBS substrate as much as possible, and as in order to expedite DBS processing by automation of the separation process, the spots can be cut from the substrate with automated mechanical punching machines, i.e. by punching the dried blood spots out of the DBS substrate, creating individual dried blood spot disks without human contact. Here, the samples are standardly contained in a planar sheet made of fibrous material, from which several samples with a small diameter can be taken, for example in the range of 0.8 to 6.0 mm, wherein the shape of these samples is usually substantially circular (due to the fact that blood spots on the substrate are normally shaped in a roughly circular shape). In general, conventional punching tools for taking such biological samples comprise a punch and a die provided with a punching channel for conveying the sample from the upper surface of the die towards the lower end of the die. After the punching process, i.e. after the sample has successfully been punched from the sheet, the circular sample sheet fraction constituting the disk containing the dried blood spot is transferred from the punching instrument to a small receiving container placed beneath the punching instrument. The container can be a well, a tube or a small cup which can easily be transported onward, for example to laboratory equipment where the sample will then be analyzed. As an example, WO2009/068749 A2 describes such a known punching tool. Here, the separation of the dried blood spots from the substrate by means of a punching machine, however, exhibits several problems. For example, single punching devices for multiple sample spotting procedures are commonly utilized in laboratories; however, besides the fact that such a punching device is usually expensive and that each punching process can generate undesired substrate dust and sometimes even fume due to frictional heat generation when punching the substrate, the repeated use of the same punching device often causes carry-over and cross-contamination since minimal residues of sample can remain on the punching instrument, even when applying cleaning and sterilization procedures, which residues can result in the undesired effect that subsequent negative samples might appear positive, i.e. generate a false positive result.

Now, in the course of further improving the described DBS separation process, devices and methods have already been developed with which the DBS spots are cut out of the DBS card using touchless processing, for example by means of a laser cutter or liquid jet cutter, such as a water jet cutter or the like. In general, particularly during laser cutting of fractions of substrate sheets from DBS carriers, dust and fume can be generated due to these high-powered and invasive cutting processes, which, thus, might still lead to undesired carry-over and cross-contamination. In order to resolve these remaining issues, improved laser cutting methods for DBS carriers have been proposed, which remedy at least some of the disadvantages of the previous prior art. Such an improved laser cutting method can be taken from, for example, US 2015/040688 A1, which discloses a system for processing DBS cards using laser cutting approaches to provide for rapid, contamination-free processing. The system disclosed in US 2015/040688 A1 includes a DBS card hopper for holding multiple DBS cards in a stack, and a DBS card support for accurately and repeatedly positioning the DBS card without physically contacting any of the spots, i.e. touchless processing. Furthermore, the system of US 2015/040688 A1 additionally includes an exhaust configured to collect and vent fume generated by the laser cutting of the DBS card, which exhaust includes a fume collector and a vent for the collected fume. Here, the fume collector is positioned above and sidewards of the portion of the DBS card from which the fume and the dust emanate. However, even though this system constitutes already a significant improvement compared to the remaining state of the art, the exhaust of US 2015/040688 A1 is still insufficient to remove all fume and dust sufficiently, and, thus, is not applicable to positively avoid undesired carry-over and cross-contamination, resulting in that negative samples can still generate a false positive result. Also, the system of US 2015/040688 A1 is considered to be complex and, thus, expensive. Furthermore, such systems of the state of the art usually handle DBS cards in an open manner, i.e. in an non-concealed environment, which additionally supports cross-contamination. Also such systems have frequently an issue of running unreliable, since the handled DBS cards are often wavy and flappy, and since the known systems cannot provide for support of various different types of DBS cards. Accordingly, the known systems can not provide sufficient reliability or safety and is not able to offer a sufficient degree of automation and throughput.

In view of the foregoing, there is a need for providing a system for processing dried fluid samples applied to a substrate, configured for performing both touchless cutting of fractions of substrate sheets from DBS carriers in a simple and cost-efficient manner, since such systems are often operated in resource-limited settings, and sufficient extraction of fume and dust generated by the cutting, as well as the need for a respective method which also solves the problems of the state of the art as mentioned above.

SUMMARY OF THE INVENTION

In view of the above, and in accordance with an aspect of the present invention, an improved system for processing at least one substrate containing a dried fluid sample is provided, the system comprising a support configured to position the substrate, the substrate preferably being implemented in the form of a sample carrier such as a dried blood spot (DBS) card; a laser device for directing a laser beam to the substrate, also simply referred to as laser, configured to cut at least one area of the substrate containing the dried fluid sample by means of the laser beam, the substrate area to be cut preferably being exposed to the laser beam; a container holder configured to hold and position a container for receiving the cut area, the container holder being arranged below the substrate, the container preferably being implemented in the form of a sample tube; and an extraction subsystem for extracting fume and/or dust generated when laser cutting the substrate, wherein the extraction subsystem consists of at least two extraction components sandwiching the substrate there between. Here, the extraction subsystem of the inventive system can also be referred to as fume extractor. Further, the term "sandwiching" or "sandwiched" is to be understood in the common sense as a positioning of the substrate between two other things, such as between two particular layers or surfaces of the extraction components facing each other, in the sense of the substrate being constrained or clamped in a narrow space in between them. Accordingly, the substrate can be constrained by the respective surfaces of the two extraction components, but can also be constrained by other components of the inventive system in a way such that the substrate is positioned in between the extraction components. Furthermore, the term "laser beam" is to be understood as a localized cutting impact produced by using a radiation source, such as a laser source. Also, cutting impact is to be provided in a so called cutting plane which is usually chosen to be in the focus point of the laser, wherein a lens or a set of lenses can be used to focus the laser beam onto the substrate. Here, the laser source can be a diode laser, a $CO_2$-laser or the like, wherein the laser is generally selected such that it is able to cut the material of the DBS within a required time. The most important criteria for the applicability of the laser are the chosen wavelength, its optical power and the beam parameter product.

With the system of the present invention, enhanced fume/dust control can be achieved and the problem of the state of the art of occasionally generating a false positive due to undesired carry-over and cross-contamination can be reduced to a minimum, or can be avoided entirely. Thus, the system of the present invention solves the disadvantages or problems of the current state of the art by means of a dust and/or fume free DBS card processing system allowing a cross-contamination free cutting of DBS spots from DBS cards, using laser cutting and an efficient fume/dust control in the form of the previously mentioned extraction subsystem. Preferably, in the system of the present invention, the fume and/or dust is evacuated from the laser cutting substrate area by extracting the fume and/or dust proximate to a laser cutting point on the substrate. Thereby, the extraction subsystem is able to evacuate the fume and/or dusty air from a laser cutting section efficiently, by extracting the generated fume and/or dust as close as possible at the source of origin, i.e. by extracting the air comprising the generated fume and/or dust through upper and lower extraction components as soon as they are generated. Here, the terms "proximate" and "as close as possible" are to be understood as the extraction components being arranged adjacent to the substrate area to be cut by the laser, that is the extraction components, or at least the respective air extracting openings thereof, are arranged adjoining to the usually heat-affected laser cutting point on the substrate, so that the fume and/or dusty air from the laser cutting section can be aspirated comprehensively.

In accordance with a preferred configuration of the system of the present invention, the extraction component which is provided on a laser device facing side of the substrate, i.e. a side of the substrate that is turned towards the laser device, also referred to as "laser-facing side" of the substrate, comprises a preferably circular central opening sized in accordance with a diameter of the laser beam. Thereby, it can be ensured that the laser beam can pass through the central opening of the extraction component on the laser-facing side of the substrate, such that the laser device can be applied onto an area of the substrate being exposed to the laser beam, thereby cutting through the respective area of the substrate. Here, the extraction component allowing the laser beam to pass through to the substrate area to be cut can also be referred to as laser-facing side extraction component, or as upper extraction component, due to its usual arrangement above the substrate. Further preferably, the extraction component provided on a side of the substrate not facing the laser device, i.e. a side of the substrate that is turned away from the laser device and that is opposite to the laser-facing side of the substrate, also referred to as "laser-opposite side" of the substrate, comprises a central opening sized to allow the container for receiving the cut substrate area to pass through. Thereby, it can be ensured that the substrate area cut by the laser beam from the substrate, i.e. a DBS spot or at least a fraction thereof, can pass through the preferably circular opening of the extraction component on the laser-opposite side of the substrate, such that the cut substrate area can be collected by means of the container. Here, the extraction component allowing the cut substrate area to pass through to the container can also be referred to as container-facing side extraction component, or as lower extraction component, due to its usual arrangement below the substrate. After cutting, the cut substrate area drops into the container placed below the cutting section solely by gravity, which is the preferred manner of placing the cut substrate area into the container. Thus, in case the container is provided below the lower extraction component, after cutting, the cut substrate area then drops into the container placed below the lower extraction component solely by gravity, which is the preferred manner of placing the cut substrate area into the container. Alternatively or additionally, the cut substrate area might also be pushed, blown or sucked into the container by means of additional means, such as pushing means, blowing means or suction means particularly provided for actively transporting the cut substrate area into the container. In general, the substrate area cut by the laser beam from the substrate can be an area incorporating one entire blood spot, in the sense of a blood spot disk or blood spot square, or can be only a fraction of such an area, wherein, for example, several fractions of the area incorporating one entire blood spot can be cut subsequently until either the entire blood spot is cut in fractions, or a sufficient amount of the entire blood spot has been cut from the substrate, sufficient enough for further processing. Accordingly, the opening in the lower extraction component usually has a diameter slightly larger than the cut-out spot. Alternatively, however, the diameter of the opening in the lower extraction component can also be smaller in case the area is cut out by several cuts, and each cut area is then smaller than the total cut area, i.e. the total spot to be cut out.

Further preferably in the system of the present invention, vacuum is applied to the extraction subsystem for extracting the fume and/or dust generated when laser cutting the substrate, wherein the negative pressure of the applied vacuum is particularly adapted to extract the fume and/or dust from the laser cutting section but to not affect the cut substrate area itself, for example by moving the same in an undesired direction, i.e. a direction that is not the direction towards the container, or even by sucking the cut substrate area to or into one of the extraction components. Accordingly, the vacuum applied to both extraction components is controlled to be strong enough to extract the fume and/or dust comprehensively from the laser cutting section but low enough to not aspirate the cut substrate area. Also the difference between the vacuum pressure at the upper extraction component and the vacuum pressure at the lower extraction component is adjusted to not direct the cut spot in an undesired direction. Therefore the difference between the applied vacuum pressures has to be sufficiently small. Here, as a typical example using a 20 W-$CO_2$-Laser, at a cutting speed of 20 mm/sec, the difference between the applied vacuum pressures is adjusted for resulting in a cumulative upper and lower airflow being in a range of 100 to 2000 ml/sec. The system of the present invention can comprise particular means to adjust the desired vacuum difference, or the vacuum difference might be created by design. In general, the desired vacuum conditions need to be adjusted to the final geometric situation of the extraction subsystem, to the material to be cut, i.e. in particular its tendency to form fume and/or dust, the power of the cutting laser and also its cutting speed.

Furthermore, the extracted fume and/or dust can be guided through a filtering component such as a filter for absorbing fume and/or dust particles before exiting the system of the present invention, i.e. a so-called air filter or the like. Thereby, the air aspirated by the extraction subsystem can be processed by means of a highly efficient filter, in order to eliminate the fume and/or dust from the aspirated air and to keep the surroundings of the system of the present invention free of biological samples, i.e. free of potential biohazard. According to a further preferred configuration of the system of the present invention, the at least two extraction components of the extraction subsystem are implemented as funnels, preferably in the form of annular extraction funnels with a circular opening at the respective funnel neck, and further preferably wherein an extraction flow path passes an annular clearance downstream of the circular opening for generating sufficient homogeneous radial flow, i.e. mostly circular arranged air evacuating funnels, which are described in further detail further below. Here, the filter for absorbing fume and/or dust particles can be a collective filter into which all of the extraction components lead, or a combination of several filters each of which being provided for each of the extraction components, in order to sufficiently collect the fume and/or dust particles from the aspirated air. Furthermore, in order to avoid contamination of the substrate by ambient air when aspirated by the vacuum applied to the extraction subsystem, the cutting arrangement can be located in a shielding box, and the air aspirated into the shielding box can again be filtered, wherein the air entering the shielding box may be filtered by a separate filter, or the exhaust air of the vacuum system aspirating the air at the extraction subsystem is directed back into the shielding box. Here, the shielding box is a particular box in which the laser cutting is executed, wherein the shielding box has two particular functions: First of all, to protect the outside from the inside, i.e. the surroundings from the cutting area and, thus, particularly the operator from any moving parts, as well as from laser light leaving the box. Secondly, to protect the inside from the outside, such as protection from dust aspirated from the surroundings.

In accordance with a preferred configuration of the system of the present invention, the system can further comprise a loading/unloading subsystem for manually loading/unloading the substrate and/or the container, i.e. a subsystem where into the spot collection tube and the DBS card can be loaded before cutting and unloaded after cutting. Thereby, it becomes possible to manually select the substrate to be cut and/or the container for receiving the cut substrate area, and to place the same in the loading/unloading subsystem or take the same from the loading/unloading subsystem, providing the positive effect that an operator can manually chose the substrate to be analyzed, as well as the desired form of the container for further processing. Also, by means of the loading/unloading subsystem for manually loading/unloading the substrate and/or the container, the system of the present invention follows and supports a semi-automated or a fully automated workflow, which improves throughput and reliability of the processing of the dried fluid samples applied to the substrate. Accordingly, the most critical procedure carried out by the system of the present invention, that is the cutting of the substrate area containing the dried fluid sample from the substrate, is conducted by a fully automated subsystem, whereas the loading and unloading can be done manually. Here, the fully automated subsystem preferably has full control over the powering of the laser device, a position of the substrate in the system, the extraction subsystem, a distance between the laser and the substrate, a cutting speed and a contour of the substrate area to be cut. For safety reasons the laser cutting process has to be conducted in a laser tight environment, in order to not endanger the operator.

The automated subsystem provides automatic control that the laser is only operated when the substrate and the container have been loaded into the loading/unloading subsystem and are fully retracted into the system and are locked in the system to avoid unintended opening during laser processing. In order to be able to do so, the loading/unloading subsystem preferably comprises a loading unit in the form of a loading tray for receiving and tauten the substrate, i.e. a frame for accommodating the substrate in a tightly stretched manner, making it significantly easier to be able to cut the desired substrate area from the substrate, since any kind of warp or distortion in the substrate e.g. generated when applying the fluid sample to the substrate before drying, can disturb a clear and precise cutting of the respective substrate area carrying the dried fluid sample. In the system of the present invention, the loading tray is positioned on the support configured to position the substrate inside the system, in order to be able to hold the substrate in the desired cutting plane and to position the substrate during cutting in a precise manner. The loading tray of the loading/unloading subsystem of the present invention is preferably adapted to fit into a cassette for holding the substrate separate from other substrates held in other cassettes, in order to be able to avoid direct cross-contamination between several substrates.

Now, in order for the system of the present invention to be able to position the substrate as desired in the system and to control a cutting speed and a contour of the substrate area to be cut, the substrate support of the system preferably comprises an x-y positioning stage for positioning and/or moving the substrate relative to the laser device. Accordingly, the contour cut is realized by a corresponding means in the form of the x-y positioning stage which can be driven to move the substrate vis-à-vis the laser, or better the focus point of the laser. Thereby, the substrate can be moved in relation to the focus point of the laser, i.e. in relation to the cutting point of the laser, wherein the cutting contour of the cut substrate area is achieved by moving the substrate around the laser's cutting point. Alternatively or additionally, the laser device can be configured to orient the laser beam relative to the substrate. This orientation of the laser can be implemented, for example, in that the laser device is held by a laser device support configured to position and/or move the laser beam relative to the substrate by means of an x-y positioning stage, similar to the x-y positioning stage of the substrate support. As further alternative, the system of the present invention can further comprise means using mirrors for guiding the laser beam relative to the substrate, such as a galvo drive or an x-y positioning stage including moving mirrors, or the system can further comprise fiber optics for guiding the laser beam relative to the substrate. Thus, the possibility exists to move the substrate as well as the focus point of the laser relative to each other, thereby enhancing the cutting speed of the entire system, in order to improve throughput of DBS processing. In general, with the described means, it is not required that the laser device is positioned in close proximity to the substrate; however, in regard to a compact design, if desired, the laser device can also be positioned in close proximity to the substrate, wherein the remaining components of the system have to be adopted to the compact design of the entire system.

In accordance with a further preferred configuration of the system of the present invention, the system can also further comprise means for extracting analytes from the dried fluid sample contained in the cut substrate area. Alternatively or additionally, the system further comprises means for analyzing the cut substrate area, matter present in the cut substrate area, or analytes extracted from the dried fluid sample contained in the cut substrate area. Thereby, the system of the present invention can provide a highly effective workflow of processing dried fluid samples applied to the substrate, i.e. up to the point where the system actually provides the results of the analysis of the fluid sample on the substrate. Accordingly, the thus configured system bases on a cutting laser and can include a loading tray to give rigidity and an automation interface to the substrate, wherein a magazine can harbor the loading trays separately, and can further comprise a tray handler or tray gripper, and an efficient fume and/or dust evacuation subsystem, wherein the system may include downstream means to extract analytes and/or to analyze the blood spots extracted from the substrate, thereby being able to provide a fully automated system, or a highly-efficient semi-automated system, depending on the provision of a manually loading/unloading subsystem as described above.

According to a further aspect of the present invention, a method for automated processing at least one substrate containing a dried fluid sample by means of a system as described above is provided. That is, the inventive method basically incorporates substantial steps for operating the above system of the present invention. Here, the method comprises at least the steps of positioning the loaded substrate in alignment with the loaded container and with the extraction subsystem, wherein the loading of the substrate and the loading of the container preferably occurs manually by use of the above described loading/unloading subsystem, and wherein the alignment of the substrate with the container and with the extraction subsystem preferably occurs due to the above described movable substrate support being movable by means of the x-y positioning stage for positioning and/or moving the substrate; applying the laser beam on the substrate for laser cutting at least the area of the substrate containing the dried fluid sample; depositing the cut substrate area into the container, wherein the cut substrate area can be cut in one single piece, such as a cut-out DBS spot disk, or in several fractions, and the cut-out piece or pieces of substrate are deposited into the container by gravity drop; and unloading the substrate and the container comprising the cut substrate area, wherein the unloading of the substrate and the unloading of the container preferably occurs manually by use of the above described loading/unloading subsystem. Furthermore, in the course of the method of the present invention, fume and/or dust is extracted from the laser cutting zone on both sides of the substrate at least during the step of applying the laser beam on the substrate, preferably by means of vacuum applied to the extraction subsystem, wherein the applied vacuum pressure is particularly controlled, such as by means of a feedback-control, to extract the fume and/or dust but to not affect the cut substrate area itself. Here, the term "not affect the cut substrate area itself" is to be understood in the sense that the cut substrate area is not, for example, moved in an undesired direction, i.e. a direction that is not the direction towards the container, or even by sucking the cut substrate area to or into one of the extraction components. The steps of the inventive method are preferably carried-out in the previously named order, except for the step of extracting fume and/or dust from the laser cutting zone on both sides of the substrate, which step is carried out simultaneously to at least the step of applying the laser beam on the substrate.

As further step of the method of the present invention, a step of imaging the substrate and selecting the substrate area to be cut can be carried out before the step of applying the laser beam, preferably wherein the substrate area to be cut is selected automatically by a respective component of the system, such as a control component or the like, preferably in the form of a computer device, or by the operator who can also determine in the same step if the substrate area to be cut is supposed to be the entire blood spot, or only fractions thereof. Here, the step of imaging the substrate and selecting the substrate area to be cut can be carried out with the assistance of the computer device and by means of an input/output (IO) component, such as a computer display or the like.

In accordance with a further preferred configuration of the system of the present invention, either the substrate or the laser beam is moved during the step of applying the laser beam on the substrate, for laser cutting at least the area of the substrate containing the dried fluid sample, or even only a fraction thereof. Now, in order for the system of the present invention to be able to move the substrate or the laser as desired and to control a cutting speed and a contour of the substrate area to be cut, the substrate support can comprise an x-y positioning stage for positioning and/or moving the substrate relative to the laser device, such that the cut is realized by simply applying the laser beam onto the substrate and moving the substrate vis-à-vis the laser, or better the focus point of the laser, in the sense that the substrate is moved around the laser's cutting point. Alternatively or additionally, the laser beam can also be oriented relative to the substrate, for example by moving the laser beam relative to the substrate by means of an x-y positioning stage or the like, similar to the x-y positioning stage of the substrate support. As further alternative, the laser beam can be moved using mirrors for guiding the laser beam relative to the substrate, such as a galvo drive or an x-y positioning stage including moving mirrors, or the system can further comprise fiber optics for guiding the laser beam relative to the substrate. Thus, the possibility exists to move the substrate as well as the focus point of the laser relative to each other, thereby enhancing the cutting speed and, thus, the throughput of the inventive method. As further optional method step, for the sake of additional security and safety for the operator, the method of the present invention can further include a step of controlling the operation of the laser device for ensuring that the laser beam is only applied onto the substrate when the substrate and the container have been loaded and fully retracted into the system, with the operator not being able to manually intervene in any way. Thereby, it can be ensured that the sample can not be contaminated, and that the operator can not be harmed by means of the laser beam, or also by means of any of the moving parts inside the system of the present invention. Additionally or alternatively, the method of the present invention can further include a step of controlling the laser power, i.e. the intensity of the laser beam for cutting the substrate, the position of the substrate as already mentioned above, the distance between the laser and the substrate, meaning that an additional component for moving the laser and/or the substrate holder to or apart from each other, for example by means of an additional z-positioning stage, the cutting speed, and/or the area contour to be cut. In general, such a step of controlling these parameters of the cutting process can be carried out either automatically by a respective component of the system, such as a control component or the like, preferably in the form of a computer device, or by the operator who can influence and/or adjust these parameters with the assistance of the computer device and, for example, by means of an input/output (IO) component such as a computer display or the like, as already described above.

Finally, as a subsequent step of the inventive method of the present invention, for example as a final step, the method can further include a step of analyzing the cut substrate area, matter present in the cut substrate area, or analytes extracted from the dried fluid sample contained in the cut substrate area. Hereto, the system as described above can also comprise conveying means as well as the respective analytical equipment, for example for DNA analysis or metabolic analysis of the dried biological sample, which can convey the cut substrate fractions to the analytical equipment and which analytical equipment can be used for analyzing the cut fractions, for analyzing matter present therein, or for analyzing analytes extracted therefrom can be part of the system itself, wherein the means for extracting the analytes from the cut substrate fractions can also be part of the analytical equipment.

The present invention is not limited to the particular methodology and reagents described herein because they may vary. Although any methods and materials similar or equivalent to those described herein can be used in the practice of the present invention, the preferred methods and preferred materials are described herein. Further, the terminology used herein is for the purpose of describing particular embodiments only and is not intended to limit the scope of the present invention.

As used herein and in the appended claims, the singular forms "a", "an", and "the" include plural reference unless the context dearly dictates otherwise. Similarly, the words "comprise", "contain" and "encompass" are to be interpreted inclusively rather than exclusively; that is to say, in the sense of "including, but not limited to". Similarly, the word "or" is intended to include "and" unless the context clearly indicates otherwise. The terms "plurality", "multiple" or "multitude" refer to two or more, i.e. 2 or >2, with integer multiples. Furthermore, the term "at least one" is to be understood as one or more, i.e. 1 or >1, also with integer multiples. Accordingly, words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize. Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

The following examples are intended to illustrate various preferred embodiments of the invention. As such, the specific modifications as discussed hereinafter are not to be construed as limitations on the scope of the present invention. It will be apparent to the person skilled in the art that various equivalents, changes, and modifications may be made without departing from the scope of the present invention, and it is thus to be understood that such equivalent embodiments are to be included herein.

BRIEF DESCRIPTION OF THE FIGURES

Further aspects and advantages of the present invention will become apparent from the following description of particular embodiments illustrated in the figures in which:

FIG. 3a a schematic illustration of the interior of the system as shown in FIGS. 1 and 2 with particular focus on the arrangement of an extraction system at the substrate, including cut-free detailed illustrations of the components of the extraction system in a perspective view of;

FIGS. 4a to 4c are schematic illustrations of a loading tray of a system according to a second preferred embodiment of the present invention in a perspective view, wherein FIG. 4a shows the loading tray in an open state without substrate, FIG. 4b shows the loading tray in an open state with the inserted substrate, and FIG. 4c shows the loading tray in a closed state with the inserted substrate;

DETAILED DESCRIPTION OF THE INVENTION AND EXAMPLES

Figure 1:
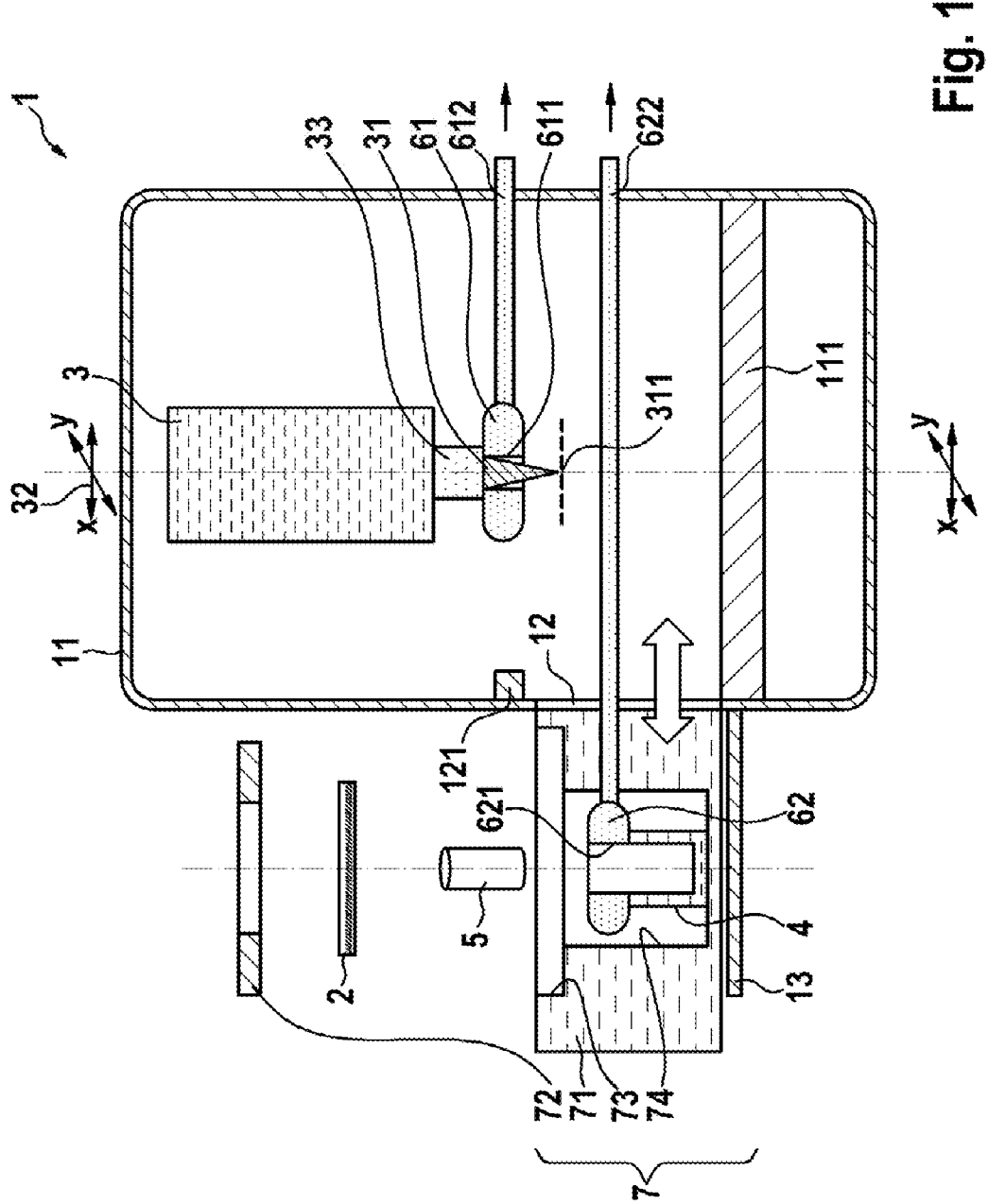
FIG. 1 is a schematic illustration of a system for processing a dried fluid sample applied to a substrate according to a first preferred embodiment of the present invention, before loading the substrate into the system.

In FIG. 1, of a system 1 for processing a dried fluid sample 21 applied to a substrate 2, such as a DBS card 2 with a blood spot 21, according to a first preferred embodiment of the present invention is shown in a schematic manner in a side view, before the substrate 2 as well as a container 5 is loaded into a housing 11 of the system 1 through an opening 12 closable by a hinged loading/unloading front door 13 lockable by means of a door lock 121 or the like, such as an electronically controlled magnetic lock. The system 1 of the present invention can also be referred to as laser-cutting system for cutting DBS cards 2, each card 2 including at least one blood spot 21. Here, the container 5 is for receiving a cut area of the substrate 2 after cutting the same from the substrate 2 by means of a laser device 3, i.e. by means of a laser beam 31 generated by the laser device 3 and transferred through respective laser optics 33 and directed to a cutting point 311 lying in a preferably horizontal cutting plane of the substrate 2 after positioning the same in relation to the laser device 3. Also, as a further component, the system 1 can comprise an x-y positioning stage 32 for positioning and/or moving the laser device 3 relative to the loaded substrate 2 or vice versa, the x-y positioning stage 32 being schematically illustrated in FIGS. 1 and 2 by means of two arrows depicted above the laser device 3.

In the state as shown in FIG. 1, a loading tray 71 of a loading/unloading subsystem 7 is positioned in a loading/unloading mode, wherein the door 13 is hinged open, i.e. the opening 12 is in an open state, and the loading tray 71 is moved out of the housing 11 such that an operator (not shown) can load/unload the container 5 and the substrate 2 into/from the loading tray 71. Here, the loading tray 71 is supported by the door 13 which can comprise a self-supporting structure, a hinge stop or the like, and the loading tray 71 can be moved into and out of the housing 11—illustrated by the double arrow in FIG. 1 extending in a horizontal direction—by means of, for example, a track guidance system or the like, the tracks or rails of which can be provided inside the housing 11 on a base 111 and can be continued on the inside of the door 13, in order to be able to fully move the loading tray 71 out of the housing 11 into an end position outside of the housing 11. The movement of the loading tray 71 from outside of the housing to the inside thereof and vice versa can be done either manually, supported by the track guidance system and optionally one or several locks in each end position, or the movement between the two end positions can be executed by an automated x-drive, thereby implementing the loading tray 71 to be the support configured to position the substrate 2. Alternatively, the movement between the two end positions may be executed by the same x-y positioning stage 32 used later for the laser cutting. In the latter case, the base 111 comprises an x-y positioning stage 32 for positioning and/or moving the loading tray 71 and, thus, the loaded substrate 2, relative to the laser device 3.

Inside the loading tray 71 of the first preferred embodiment, a central stepped recess is provided, the stepped recess consisting of at least a substrate recess 73 in its upper surface for receiving the substrate 2 therein, and a container recess 74 provided in a bottom surface of the substrate recess 73, axially aligned with the substrate recess 73 and comprising a smaller inner diameter than the substrate recess 73. Inside the container recess 74, a container holder 4 is provided, preferably in the form of a tube rack or in the shape of a cup or pot with an inner diameter matching with the outer diameter of the usually circular container 5. Here, the alignment of the substrate recess 73 with the container holder 4 and, thus, with the container recess 74 is such that a central part of the substrate 2 is directly above the container 5 when loaded into the loading tray 71, in a way such that its main spatial extension is congruent with or at least in parallel to the cutting plane. Furthermore, in order to be able to fixate the substrate 2 in the recess 73 of the loading tray 71, a retaining component 72, for example in the form of a downholder plate shaped to be matching with the substrate recess 73, is provided, which retaining component 72 can be put onto the substrate and into the substrate recess 73. When put into the substrate recess 73, as can be gathered from, for example, FIG. 2, an upper surface of the retaining component 72 is planar with an upper surface of the loading tray 71, for easier handling of the loading/unloading subsystem 7 when introducing the same into and/or withdrawing the same from the housing 11. The retaining component 72 comprises a preferably rectangular cavity in its central part, the cavity being smaller than the substrate 2, in order to be able to fixate the substrate 2 in the substrate recess 73 but to allow the laser beam 31 to reach the substrate 2 in the cutting plane, i.e. at the cutting point 311. The system 1 as shown in FIG. 1 is designed to align the dried fluid sample spot 21 above the container 5.

Figure 2:
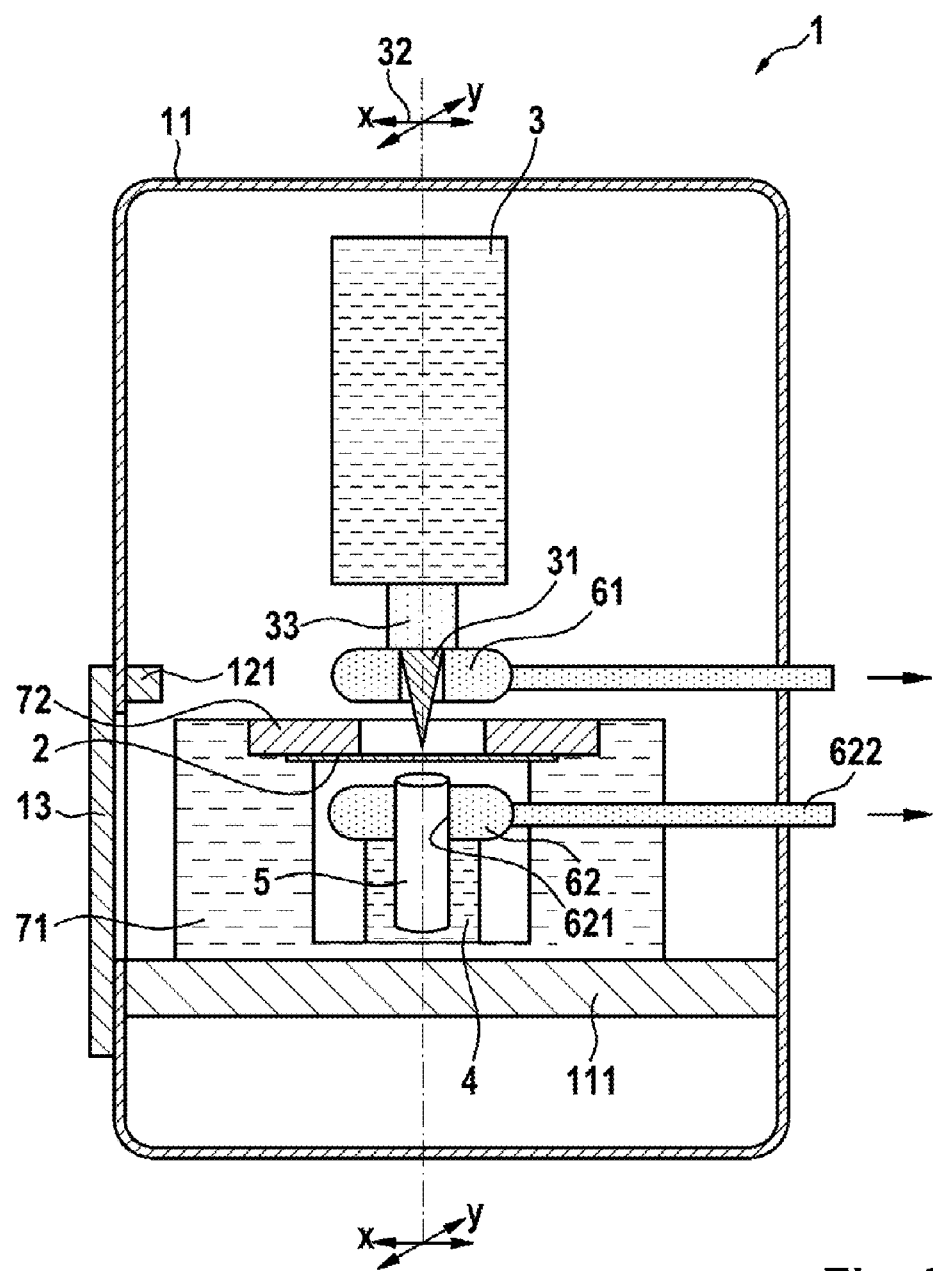
FIG. 2 is a schematic illustration of the system as shown in FIG. 1 after loading the substrate into the system and positioning the same.

FIG. 2 shows the system 1 in an operating mode after positioning the loading/unloading subsystem 7 inside the housing 11 such that the substrate 2 is positioned underneath the laser device 3. Here, the substrate 2 is positioned inside the substrate recess 73 and fixated by the retaining component 72, and the container 5 is positioned inside the container holder 4 such that its upper open end is directly beneath the cutting point 311, in order to be able to receive a cut area from the substrate 2 after cutting the same from the substrate 2, wherein the cutting area is dropping into the container 5 by gravity. Now, during cutting by means of the laser beam 31, cutting fume generated from the burning of the substrate 2 at the cutting point 311 and/or dust, i.e. small substrate particles generated during cutting of the substrate 2 at the cutting point 311 can occur, which are to be avoided in order to avoid carry-over and cross-contamination with subsequent substrates to be cut. In order to do so, an extraction subsystem 6 for extracting fume and/or dust generated when laser cutting the substrate 2 is provided in the system 1, wherein the extraction subsystem 6 of the first preferred embodiment consists of an upper extraction component 61 and a lower extraction component 62, both sandwiching the substrate 2 there between in a way such that the substrate 2 is positioned in between the extraction components 61, 62. As can be gathered from FIGS. 1 and 2, when the system 1 is installed for operation, the upper extraction component 61 is positioned above the cutting point 311, and the lower extraction component 62 is positioned below the cutting point 311. Furthermore, the upper extraction component 61 is fluidly connected to an upper aspirating tube or pipe 612, and the lower extraction component 62 is fluidly connected to a lower aspirating tube or pipe 622, wherein both pipes 612, 622 are used for aspirating/extracting air potentially comprising fume and/or dust from the area surrounding the cutting point 311. Both extraction components 61, 62 can be moved in an x-y plane, together with the respective pipe 612, 622; for example, the lower extraction component 61 and the lower aspirating pipe 612 can be moved together with the loading/unloading subsystem 7, as can be gathered from a comparison of FIG. 1 and FIG. 2. If required, the extraction components 61, 62 may be connected by a flexible tubing, allowing a movement in the x/y-plane if desired, e.g. during loading, unloading and cutting. Alternatively, not shown parts of the path between the upper extraction component 61 and lower extraction component 62 may be designed to be reversible disconnected from a (not shown) vacuum source upon unloading, and reconnected upon loading. Also, in order to compensate a potential movement of the laser device 3 in the x-y plane 32, the upper extraction component 61 can be moved in parallel to the movement of the laser device 3 to avoid directing the laser beam 31 onto the upper extraction component 61.

As to further structural features, the upper extraction component 61, i.e. the extraction component which is provided on a side of the substrate 2 facing the laser device 3 comprises a central circular opening 611 sized in accordance with the laser beam 31, or better in accordance with a maximum outer diameter thereof, in order to let the laser beam pass through without influencing the same in any way.

Thereby, it can be further ensured that the laser beam 31 can pass through the central opening 611 of the upper extraction component 61 in an unrestricted way such that the laser beam 31 can reach an area of the substrate 2 being exposed to the upside by the rectangular cavity of the retaining component 72, thereby cutting through the respective cut area of the substrate 2. Further, the lower extraction component 62 comprises a central circular opening sized to allow the container 5 for receiving the cut substrate area to pass through the central opening 621, see FIG. 2, in order to allow any cut substrate area to fall through the opening 621, i.e. to be collected by meals of the container 5 received in the opening 621. Alternatively, the container can also be placed below the lower extraction component 62 and the dropping or falling cut substrate area can drop or fall through the central opening 621, and into the container 5.

Furthermore, as shown by means of arrows in FIGS. 1 and 2, the air aspirated from the area around the cutting point 311 is guided by the pipes 612, 622 away from the interior of the housing 11 towards an outside of the housing 11, and preferably through a filtering component (not shown) such as a filter for absorbing fume and/or dust particles, in order to be able to process the air aspirated by the extraction subsystem 6 by means of a highly efficient filter in order to eliminate the fume and/or dust from the aspirated air and to keep the surroundings of the system 1 of the first preferred embodiment free of biological samples contained in the cut substrate area, for example when accidentally cutting too close to the blood spot 21 on the substrate 2 which can then become airborne in the form of dust and/or fume.

Figure 3A:
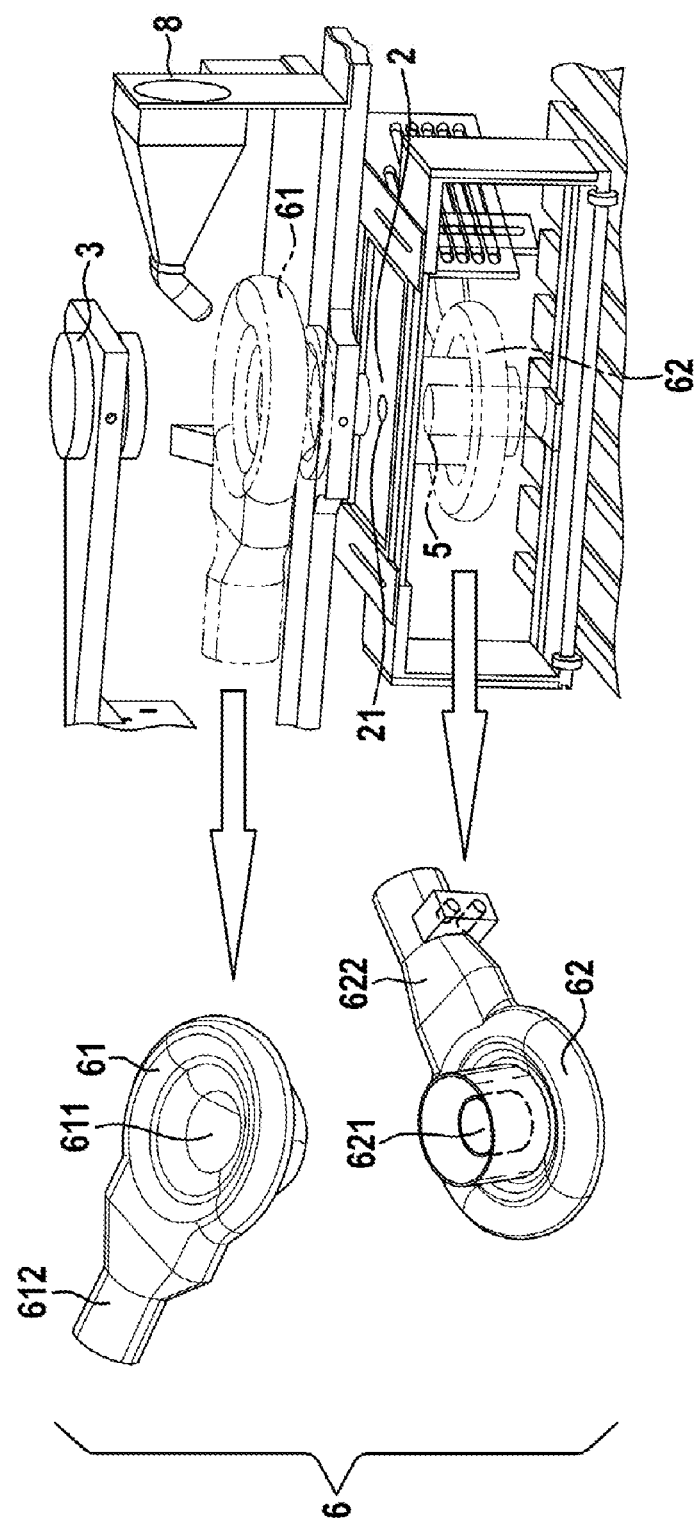

Regarding the particular implementation of the two extraction components 61, 62 of the extraction system 6 of the first preferred embodiment, the extraction components 61, 62 are preferably implemented in the form of so-called funnels, as illustrated in FIG. 3a, which figure is particularly directed to the surroundings of the substrate 2 inside the interior of the housing 11 of the system 1, and in particular to be seen in the cut-free detailed illustrations of the extraction components 61, 62 as depicted on the left side of FIG. 3a. Here, it can be gathered that the extraction components 61, 62 both comprise the shape of substantially annular extraction funnels 61, 62 which each exhibit the respective circular opening 611, 621 in a center of its respective main body 613, 623 which basically comprises a torus-like shape, or more exactly a slotted circular ring-shape, wherein the respective pipe 612, 622 is attached to the respective main body 613, 623. The extraction components 61, 62 can also be referred to as upper and lower fume extraction funnels 61, 62. Additionally, as can be seen in FIG. 3a, an optional ventilating component 8 is provided, preferably in the form of an aerator or ventilator or the like, for providing air to the area around the cutting point 311.

Figure 3B:
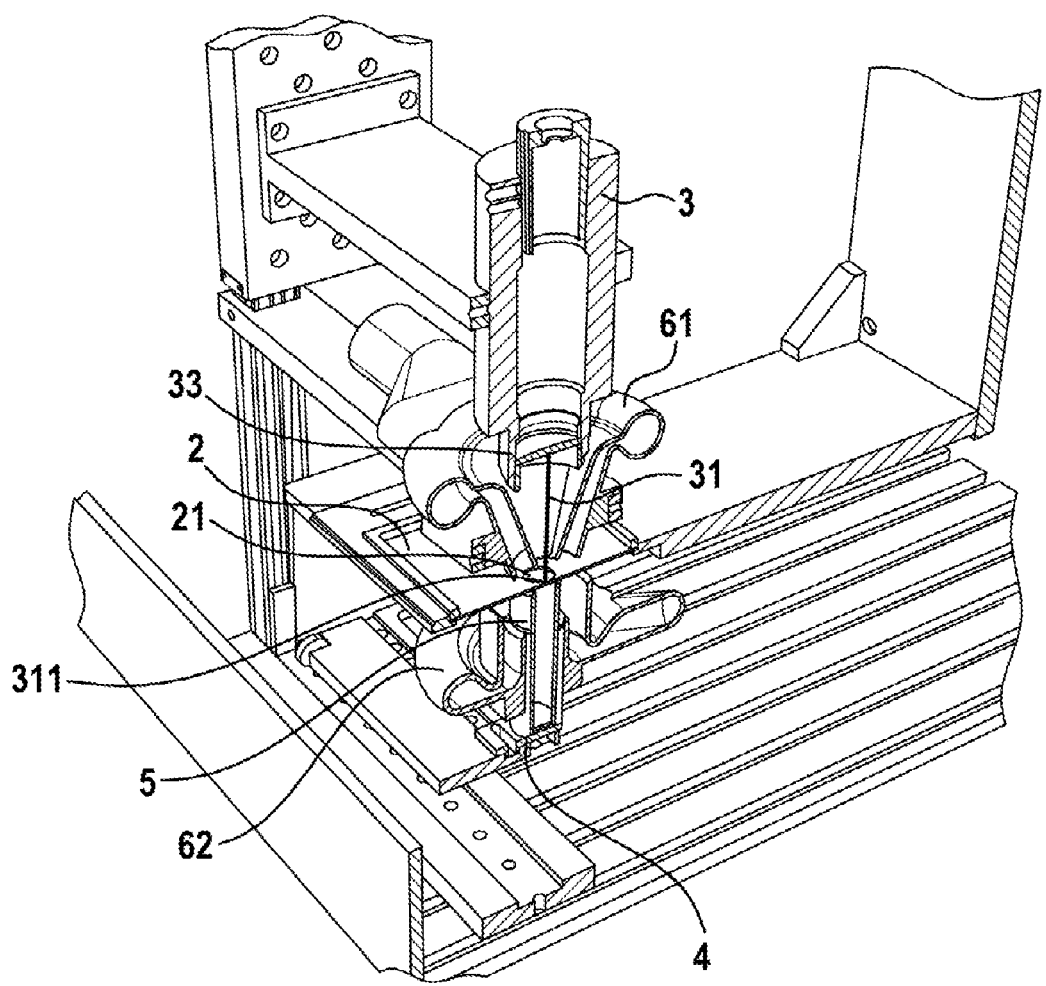
FIG. 3b is a schematic illustration of the arrangement as shown in FIG. 3a cut along a vertical axis extending along the laser beam generated by the laser device cutting the substrate in a perspective sectional view.
Figure 3C:
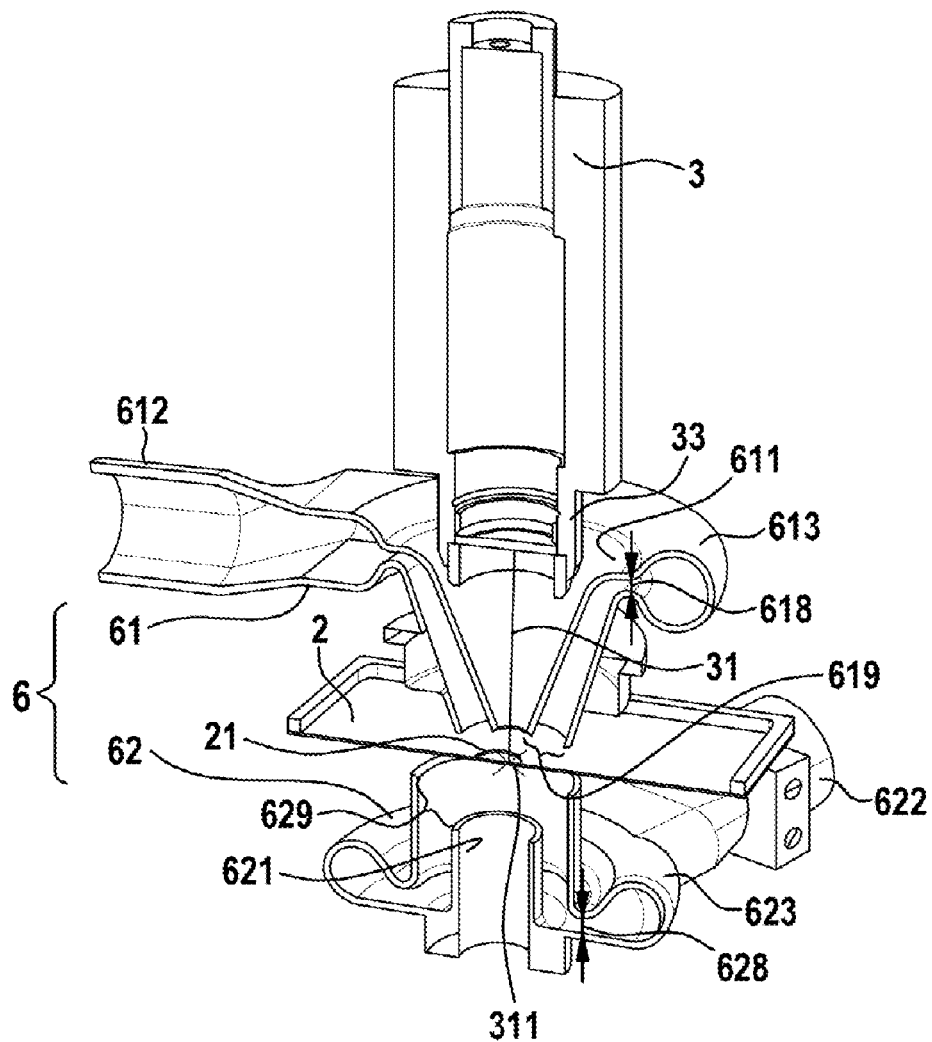
FIG. 3c is a schematic illustration of a free-cut combination of laser device, extraction subsystem and substrate as shown in FIG. 3b in an enlarged perspective sectional view.

By means of FIGS. 3b to 3g, the extraction subsystem 6 is shown and described in further detail. Here, FIG. 3b is a perspective view of the interior arrangement of the system 1 inside the housing 11 as shown in FIG. 3a, which arrangement is shown in a cutaway view cut along a vertical axis extending through the laser device 3, the upper extraction funnel 61, the lower extraction funnel 62 and the container 5, basically along the laser beam 31 generated by the laser device 3 cutting the substrate 2 at the cutting point 311. Here, it can be gathered that the laser beam 31 is cutting out the blood spot 21 being basically circular, wherein the substrate 2 and/or the laser beam 31 is/are moved in order to cut out the blood spot 21. Furthermore, it can be gathered from FIG. 3b that the laser device 3, or better the laser optics 33, are provided in part within the central opening 611 of the upper extraction funnel 61, and that the container 5 is provided in close arrangement inside the central opening 621 of the lower extraction funnel 62, wherein the substrate-facing ends of each of the upper and the lower extraction funnel 61, 62 are provided in close proximity to the substrate 2, such that the arrangement as shown in FIG. 3b does not leave any substantial gap in between its components in order to make sure that any fume and/or dust created at the area around the cutting point 311 can be evacuated as comprehensively as possible by applying a vacuum. For better understanding, FIG. 3c provides an enlarged perspective illustration of the arrangement of FIG. 3b, in which only the laser device 3 and its laser optics 33, the extraction system 6 and the substrate 2 are shown in a sectional view cut along the longitudinal axis of the laser beam 31, similar to FIG. 3b. Here again, the laser beam 31 is shown when cutting the substrate 2, an in particular cutting the blood spot 21 provided on the substrate 2, wherein the laser beam 31 is cutting the substrate 2 at the cutting point 311. From this illustration, it should be sufficiently clear that the extraction funnels 61, 62 are provided in close proximity to the cutting point 311. Also, in FIG. 3c, the substantially torus-shaped main body 613 of the upper extraction funnel 61 and the substantially torus-shaped main body 623 of the lower extraction funnel 62 are shown in further detail. Here, it can be gathered that the aspirating pipes 612, 622 merge into the substantially torus-shaped main bodies 613, 623 of the upper and lower extraction funnels 61, 62, respectively, wherein—in both cases—the preferably circular aspirating pipes 612, 622 extend into a less high but broader, mouth-shaped passage area 6121, 6221 before further developing into the main body 613, 623 of the respective extraction funnel 61, 62.

Figure 3D:
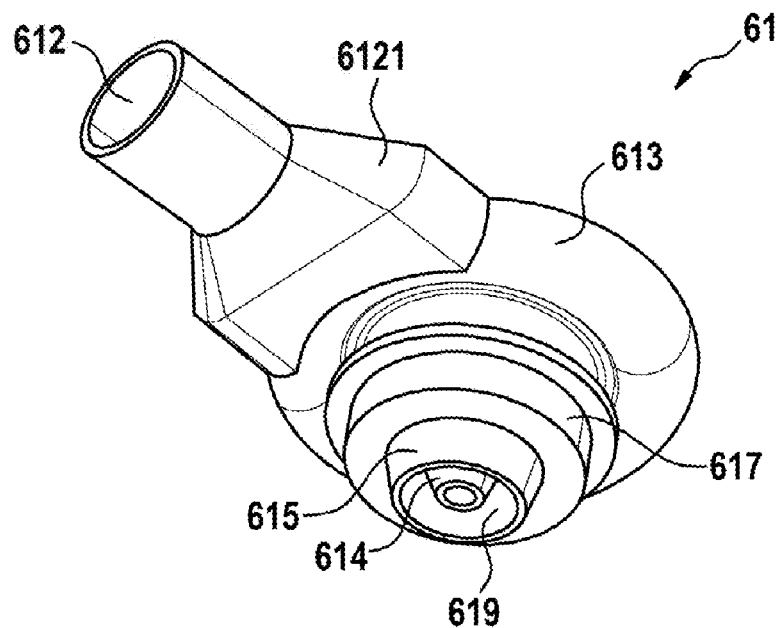
FIG. 3d is a schematic illustration of the upper extraction component of the extraction subsystem of FIGS. 3a to 3c in an enlarged perspective view.
Figure 3E:
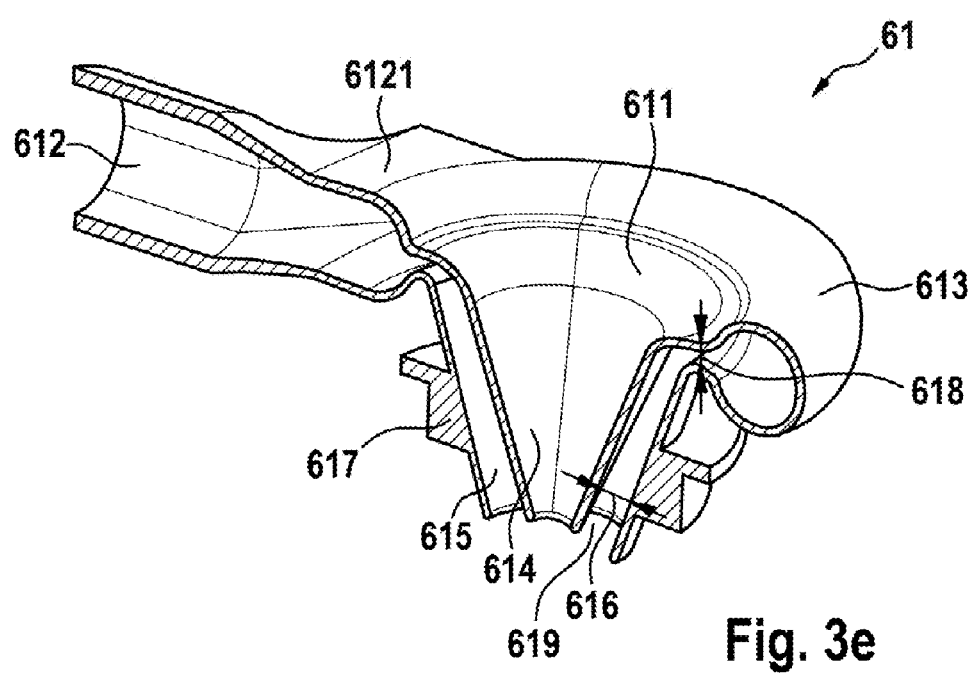
FIG. 3e is a schematic illustration of the upper extraction component as shown in FIG. 3d cut along its longitudinal axis in a perspective sectional view.
Figure 3F:
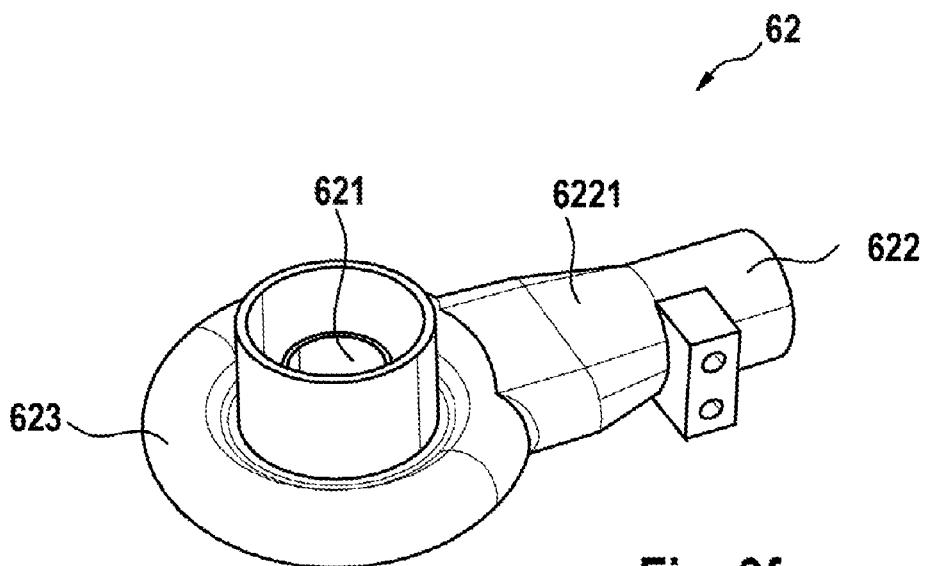
FIG. 3f is a schematic illustration of the lower extraction component of the extraction subsystem of FIGS. 3a to 3c in an enlarged perspective view.
Figure 3G:
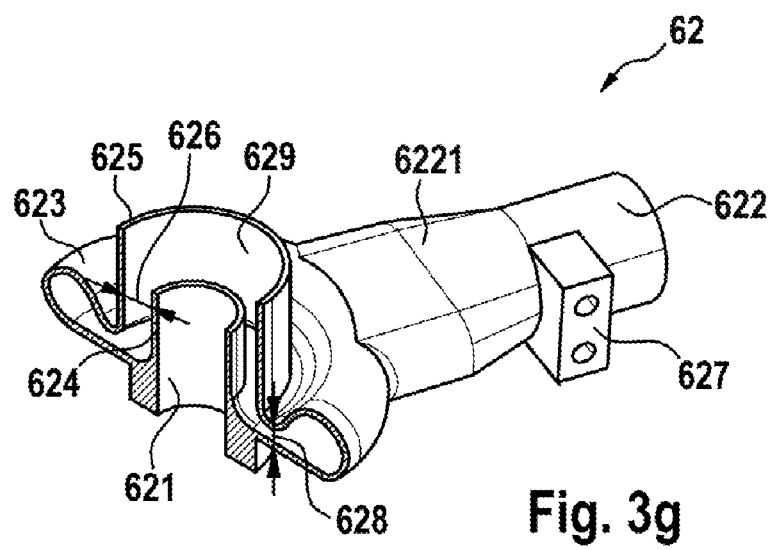
FIG. 3g is a schematic illustration of the lower extraction component as shown in FIG. 3f cut through its main body in a perspective sectional view.

A further detailed description of the upper and lower extraction funnels 61, 62 of the presently described first preferred embodiment can be taken from FIGS. 3d to 3g, in which both the upper and the lower extraction funnels 61, 62 are shown in a schematic standalone perspective view, in whole in FIGS. 3d and 3f and in section in FIGS. 3e and 3g, wherein the upper extraction funnel 61 is cut along its longitudinal axis in FIG. 3d and the lower extraction funnel 62 is cut along its lateral axis in FIG. 3d. In particular, FIG. 3d and FIG. 3e show the upper extraction funnel 61 in a bottom-up perspective view, i.e. from a substrate-facing side. Therefrom, it can be gathered that the substrate-facing end of the upper extraction funnel 61 comprises an inner cone 614 and an outer cone 615, which are provided with a distance or gap 616 in between them, wherein the inner cone 614 is tapered towards its substrate-facing end and provides the central opening 611 by its inner circumferential surface. In a similar way, however not necessarily in parallel to the inner cone 614, the outer cone 615 is also tapered towards its substrate-facing end, but furthermore provides a stepped projection 617 on its outer side, the stepped projection 617 usually being used for fixation of the upper extraction funnel 61 on a preferably movable mount inside the housing 11 of the system 1. With this arrangement of inner and outer cone 614, 615, the gap 616 turns into an annular opening 619 at a substrate-facing end of both the inner and outer cones 614, 615, in the functional sense of an annular suction ring. Further, the inner cone 614 merges into an inner part of the torus-shaped main body 613, and the outer cone 615 merges into an outer part of the torus-shaped main body 613, such that the annular opening 619 provided at the substrate-facing end of both the inner and outer cones 614, 615 is fluidly connected via the gap 616, through the inner volume of the main body 613, and through the broad passage area 6121 into the upper aspirating pipe 612. Here, as further technical feature, an annular clearance or flow restriction 618 is provided between the gap 616 and the inner volume of the main body 613, the function of which is described further below in detail.

As can be gathered both from FIG. 3d and FIG. 3e, a level of the substrate-facing end of the inner cone 614 is provided with a small distance to a level of the substrate-facing end of the outer cone 615, thereby ensuring that both ends are spaced from each other in regard to their mutually common longitudinal axis, in order to be able to put the substrate-facing end of the outer cone 615 into close proximity to the substrate 2 around the cutting point 311, but to still be able to apply vacuum, since the substrate-facing end of the inner cone 614 is not in close proximity to the substrate 2. In doing so, the upper extraction funnel 61 achieves the function of a so-called suction bell. Thereby, it becomes possible to apply vacuum to the annular opening 619 and, thus, close to the cutting point 311 on a top side of the substrate 2 with preferably only a small slit between the substrate-facing end of the outer cone 615 and the substrate 2, in order to be able to comprehensively extract fume and/or dust from the area around the cutting point 311 and guide the same through the filter (not shown) and out of the system 1. Here, it is pointed out that—in order to avoid cross-contamination—no part of the extraction subsystem 6, particularly the upper and the lower extraction funnel 61, 62, is allowed to contact the substrate 2. Therefore a small but still sufficiently distanced or spaced slit is required between the upper or the lower extraction funnel 61, 62 and the substrate 2. The upper and lower extraction funnels 61, 62 are generally designed to extract all fume and/or dust generated during laser cutting. All fume and/or dust trying to leave the area of cutting close to the cutting point 311, upon cutting, is mostly moved by heated air and by gases generated upon laser pyrolysis. However, the fume and/or dust trying to leave is immediately aspirated by the upper and lower extraction funnels 61, 62 by means of the applied vacuum. Accordingly, the extraction subsystem 6 is designed to form a fence-like surrounding of the area of cutting. The upper and lower extraction funnels 61, 62 are designed to aspirate the air from all directions as equal as possible.

In view of the function of the lower extraction funnel 62 to receive the container 5 in its central opening 621, the structure of the lower extraction funnel 62 has been designed with the same background idea as the upper extraction funnel 61, but it is significantly different from the structure of the upper extraction funnel 61, as can be gathered from FIGS. 3f and 3g, wherein both FIG. 3f and FIG. 3g show the lower extraction funnel 62 in a top-down perspective view, i.e. from a substrate-facing side. Here, it can be gathered that the main body 623 of the lower extraction funnel 62 turns into a double-cylinder structure, including an inner cylinder 624 and an outer cylinder 625, which are provided with a distance or gap 626 in between them, wherein the inner cylinder 624 provides the central opening 621 by its inner circumferential surface. Here again, similar to the upper extraction funnel 61, at a substrate-facing end of both the inner and outer cylinders 624, 625, the gap 626 turns into an annular opening 629 in the functional sense of an annular suction ring. Further, the inner cylinder 624 merges into an inner part of the torus-shaped main body 623, and the outer cylinder 625 merges into an outer part of the torus-shaped main body 623, such that the annular opening 629 provided at a substrate-facing end of both the inner and outer cylinders 624, 625 is fluidly connected via the gap 626, through the inner volume of the main body 623, and through the broad passage area 6221 into the upper aspirating pipe 622. Here, as further technical feature, an annular clearance or flow restriction 628 is provided between the gap 626 and the inner volume of the main body 623, the function of which is described further below in detail.

Also similar to the upper extraction funnel 61, a level of the substrate-facing end of the inner cylinder 624 is provided with a distance to a level of the substrate-facing end of the outer cylinder 625, wherein the distance between these levels is large compared to the distance as described in connection with the upper extraction funnel 61. Of course, as can be seen in, for example, FIG. 3b, in case the container 5 is provided inside the opening 621, a distance between the upper end of the container 5 and the substrate 2 is small, in order to bring the upper end of the container 5 in close proximity to the substrate 2. Accordingly, it can be achieved to put the substrate-facing end of the outer cylinder 625 into close proximity to the substrate 2 around the cutting point 311, but to still be able to apply vacuum, since neither t substrate-facing end of the inner cylinder 624 nor the upper end of the container 5 arranged inside the opening 621 of the lower extraction funnel 62 is not in close proximity to the substrate 2. Thereby, it becomes possible to apply vacuum to the annular opening 629 and, thus, close to the cutting point 311 on a bottom side of the substrate 2 with preferably only a sufficiently small slit between the substrate-facing end of the outer cylinder 625 and the substrate 2, in order to be able to comprehensively extract fume and/or dust from the area around the cutting point 311 and guide the same through the filter (not shown) and out of the system 1, but still to avoid cross contamination by direct contact of the lower extraction funnel 62 and the substrate 2. Here, instead of the stepped portion 617 of the upper extraction funnel 61, an attachment nose 627 is provided on the outside of the lower aspirating pipe 622 in close proximity to the broad passage area 6221, in order to be able to fixate the lower extraction funnel 62 on a preferably movable mount inside the housing 11 of the system 1.

Figure 3H:
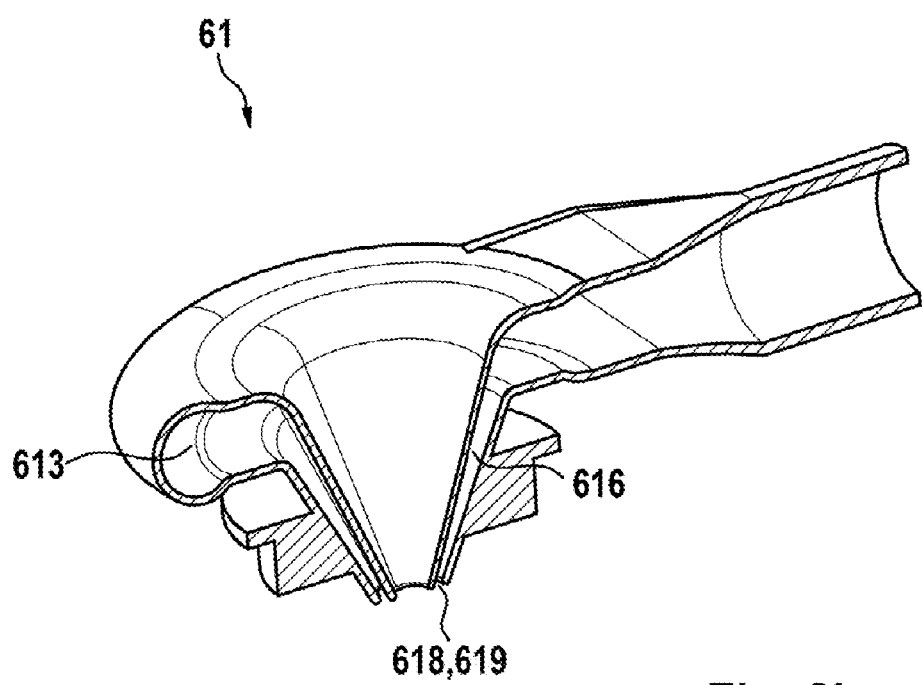
FIG. 3h is a schematic illustration of an alternative embodiment of the upper extraction component as shown in FIG. 3e cut along its longitudinal axis in a perspective sectional view.

As described above, in an order starting from a substrate-facing end, the extraction pathway of each funnel 61, 62 includes the annular opening 619, 629, the respective circular aspiration gap 616, 626, the annular clearance or flow restriction 618, 628 in the form of an annular blind, the inner part of the respective torus-shaped main body 613, 623, and the annular extraction channel connected to the respective aspirating tube or pipe 612, 622 leading—in the end- to a common outlet (not shown). Further, the annular clearance or flow restriction 618, 628 is situated downstream—in the sense of the extraction flow when applying negative pressure—after the annular opening 619, 629, in order to generate sufficient homogeneous radial extraction flow at the annular opening 619, 629. According to an alternative embodiment, the annular opening 619, 629 and the respective annular clearance or flow restriction 618, 628 may be combined into one structural element. As an example thereof, an alternative embodiment of the upper extraction funnel 61 is shown in FIG. 3h, in which the annular opening 619 and the respective annular clearance or flow restriction 618 is combined into one structural element at the substrate-facing end of the upper extraction funnel 61 in the form of a significantly narrowed annular opening 619. In any case, in order to achieve a sufficient homogenous radial flow, the respective components are adapted such that the flow resistance in the annular clearance or flow restriction 618, 628 is larger than the flow resistance in the adjacent element provided downstream, i.e. the respective torus-shaped main body 613, 623.

Figure 4A:
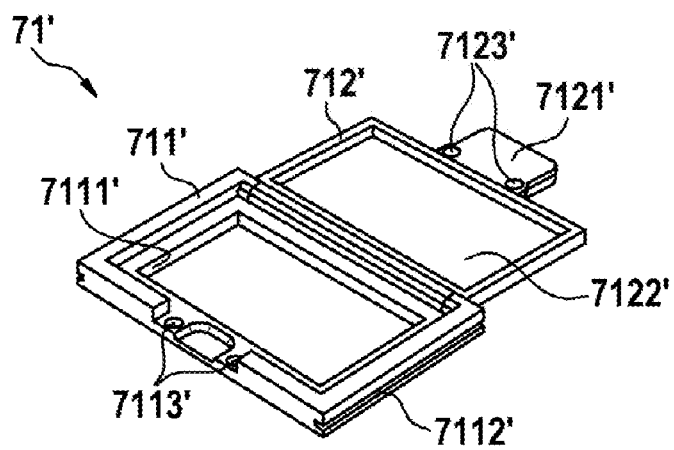
Figure 4B:
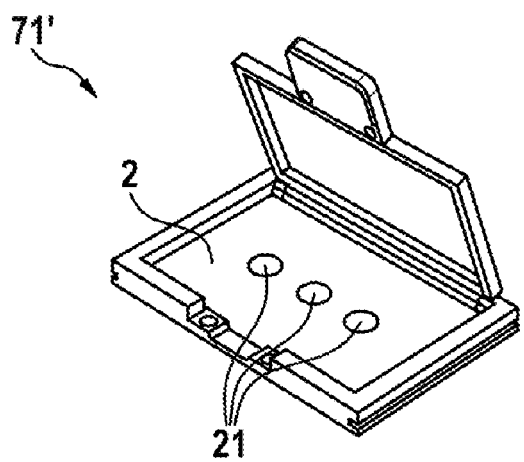
Figure 4C:
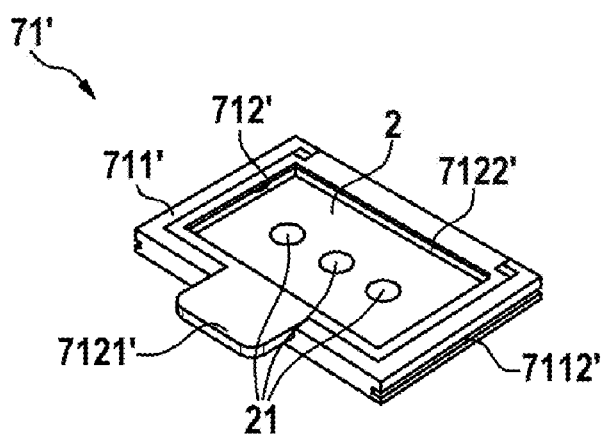

Moreover, as can be gathered from FIGS. 4a to 4d, a system according to a second preferred embodiment of the present invention comprises a loading tray 71' which is different from the loading tray 71 of the first preferred embodiment in that it is implemented in a frame-like square shape comprising of a two-component folding structure consisting of a square-shaped base frame 711' and a foldably attached lid 712' which can be folded around an axis of rotation by means of a hand grip 7121' such that the lid 712' is placed into a respective recess provided in the frame 711' so that the loading tray 71' is shut with the substrate 2 sandwiched in between the frame 711' and the lid 712', see FIG. 4c. In order to be able to cut the substrate 2 by means of the laser beam 31, the lid 712' comprises a preferably rectangular recess 7122' in the form of a through-hole, such that the lid 712' exposes at least a major part of the substrate 2 to the outside when the lid 712' is closed into the frame recess, while the hand grip 7121' is placed into a respective further recess including two magnets 7113' which can attract two counterparts 7123' in the lid 712', such as metal pieces or the like, in order to establish a magnetic lock between the lid 712' and the frame 711' when the lid 712' is closed. Moreover, in order be able to drop any cut-out area from the substrate 2 into the container 5, the frame 711' also comprises a respective frame recess 7111' which preferably corresponds to the lid recess 7122'. In an open state of the loading tray 71', as can be gathered in FIGS. 4a and 4d, the lid 712' is not closed shut into the frame recess, and the substrate 2 can be placed inside loading tray 71' over the frame recess 7111'.

Afterwards, in order to fixate the substrate 2 in the loading tray 71', the lid 712' can be closed, as can be gathered from FIG. 4c, such that the substrate 2 is clamped between the lid 712' and the frame 711' and is tauten there between in order to improve the cutability of the substrate 2 by the laser beam 31, i.e. the substrate 2 is straightened/tightened in the clamped position between the lid 712' and the frame 711', wherein the lid 712' is held by means of the magnetic lock including the magnets 7113' such that the lid 712' does not loosen on its own, in order to avoid any throwing of waves on the surface of the substrate 2. Moreover, in order to be able to position the loading tray 71' inside the housing 11, or inside a respective protective container, the frame 711' comprises guiding grooves 7112' on opposite lateral sides thereof, preferably in a way such that the hand grip 7121' protrudes from a respective protective case, as can be gathered, for example, from FIG. 4e or FIG. 4f. A respective protective case is illustrated as an example in FIG. 4d, which container is implemented in the form of a cassette 75' comprising guiding rails 751' on its inner space, the rails 751' matching the guiding grooves 7112' on the outside of the frame 711' and, thus, simplifying the insertion of the loading tray 71' into the cassette 75'. In an inserted state, the frame 711' and the cassette 75' constitute a unit dosed to the outside, in order to be able to avoid any contamination from the outside entering the inner volume of the cassette 75' and, thus, potentially coming into undesired contact with the substrate 2 or the blood spots 21 provided thereon.

Figure 4D:
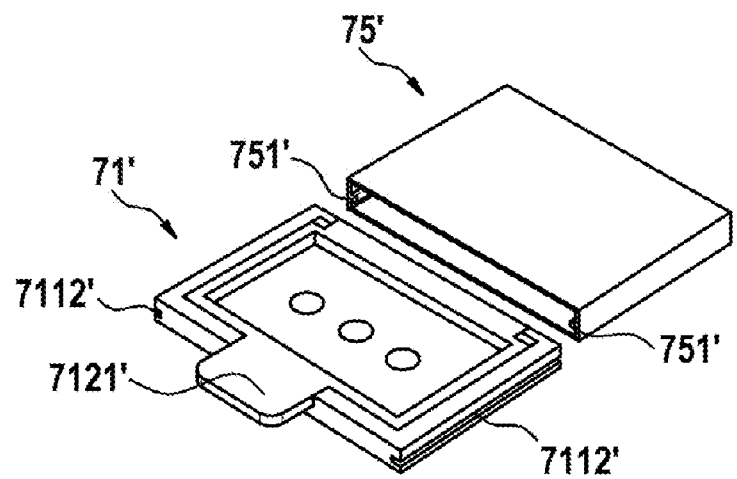
FIG. 4d is a schematic illustration of a combination of a cassette and the loading tray as illustrated in FIGS. 4a to 4c in a perspective view.
Figure 4E:
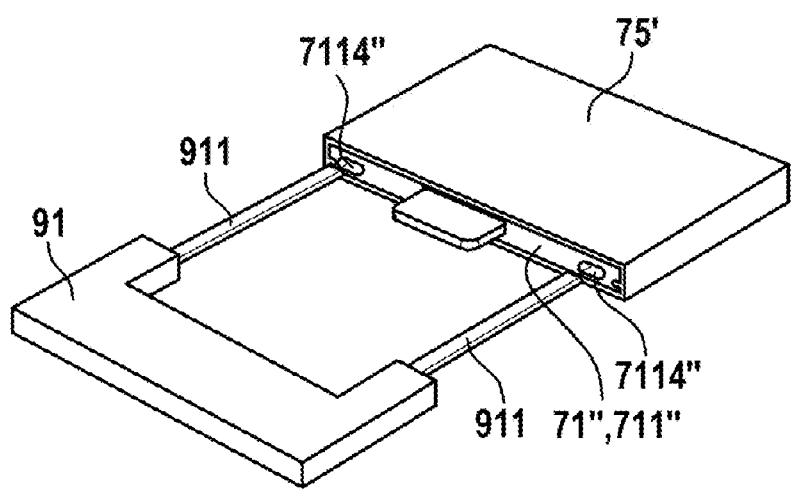
FIG. 4e is a schematic illustration of a combination of a cassette, a modified loading tray and a grasping handle in a perspective view.
Figure 4F:
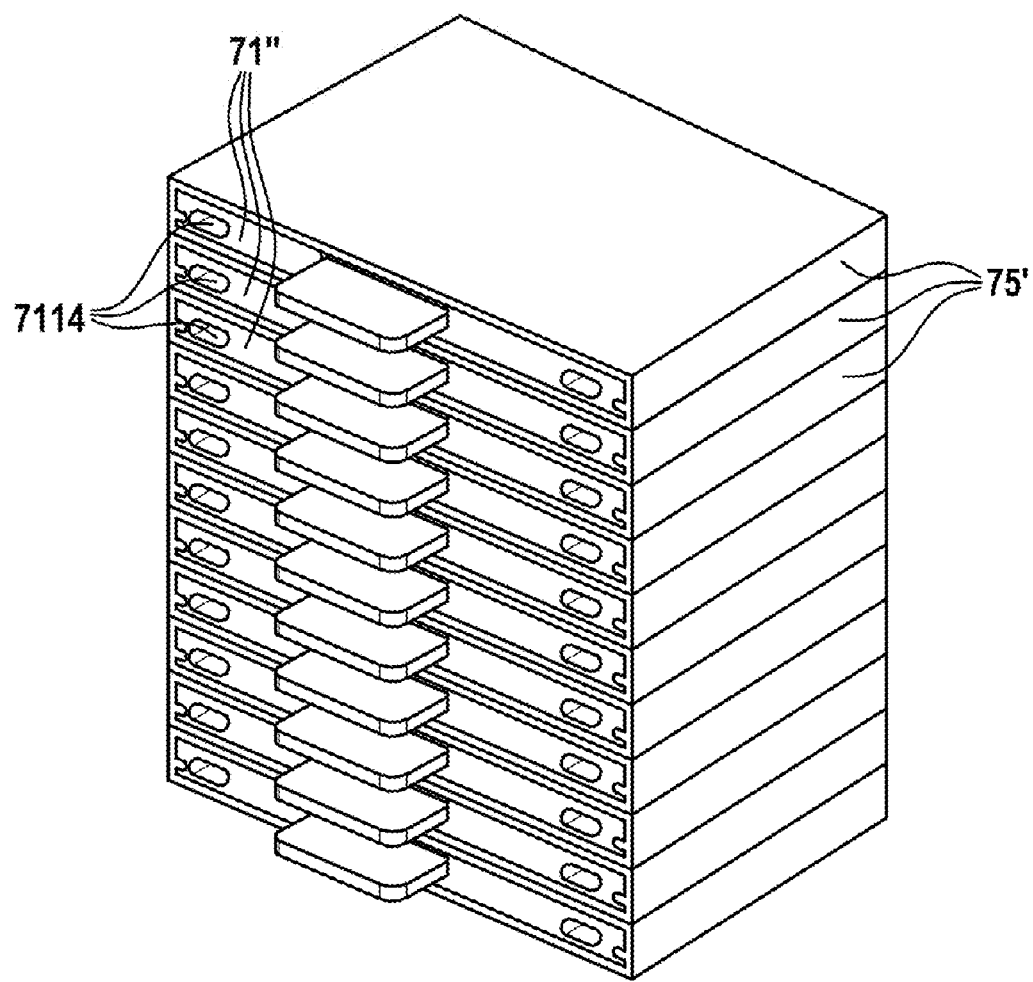
FIG. 4f is a schematic illustration of a stack of cassette-loading tray combinations as shown in FIG. 4d in a perspective view.
Figure 5:
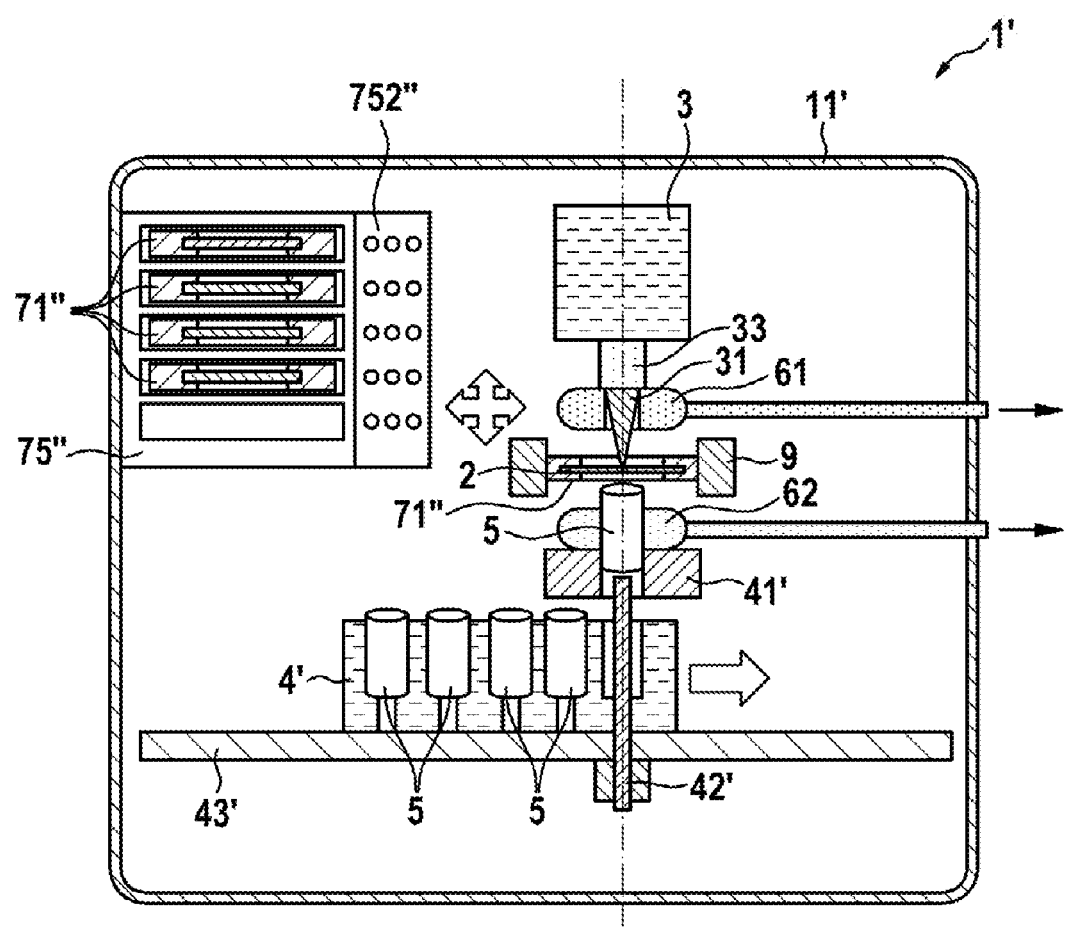
FIG. 5 is a schematic illustration of a system for processing a dried fluid sample applied to a substrate according to a third preferred embodiment of the present invention, including the stack of cassette-loading tray combinations as shown in FIG. 4f, and after positioning one loading tray for processing.

Further, as can be gathered from FIG. 4f, combined units of loading tray and cassette can be stacked together, i.e. the cassettes 75' can be stacked on top of each other, for example by means of known stacking connections, such as a tongue-and-groove connection, for easier storage and for holding each substrate separate from other substrates to avoid direct cross-contamination between several substrates, the stack being provided for example inside an automated system 1' as shown in FIG. 5 which is described in further detail further below. Here, the stack can also be referred to as a magazine which—alternatively to the stacked cassettes as shown in FIG. 4f—can also be provided in the form of one integral magazine unit 75" comprising several slots for receiving loading trays 71" as depicted in FIG. 5. Such kind of magazine unit 75" can further be provided with a labeling portion 752" comprising distinctive encoding, preferably machine-readable encoding, such as color coding or bar codes or the like, in order to be able to assign a respective label to each loading tray 71" provided inside the slots of the magazine unit 75", for automatic identification of each loading tray 71" inside the magazine unit 75".

Moreover, in the form of a modified example of the combination of FIG. 4d, FIG. 4e shows an almost identical combination of tray-cassette-combination of FIG. 4d with the exception that a frame 711" of its loading tray 71" additionally comprises grasping notches 7114" in the form of elongated cavities extending into the frame 711", with the function that a substrate handling means including a grasping handle 91 comprising grasping arms 911 can introduce these arms 911 into the notches 7114" and, for example by slightly tilting the entire handle 91 including the arms 911, wedging the arms 911 inside the notches 7114", in order for an automatic grasping means 9 comprising the grasping handle 91 to be able to pull the loading tray 71" from its cassette 75' and place the same under a laser device for cutting.

A respectively automated system 1' is schematically shown in FIG. 5 in the form of a modified system for processing a dried fluid sample applied to a substrate according to a third preferred embodiment of the present invention, including the magazine unit 75" as described above inside its housing 11' on the upper left side, and after positioning one single loading tray 71" for cutting of the contained substrate 2 underneath the laser device 3 in a way such that the substrate 2 lies within the cutting plane. Here, in this embodiment, the extraction system 6 is similar to the extraction system of the previous embodiments. However, as can be gathered from FIG. 5, the magazine unit 75" is arranged inside the housing 11' of the system 1', wherein the magazine unit 75" is either loaded/unloaded continuously, or batches of substrates are loaded into the loading trays 71" in the magazine unit 75". In a preferred implementation, the loading trays 71" are loaded from the front side of the system 1'. Once loaded, the respective loading trays 71" can be pulled from and moved inside the housing 11' by the above described substrate handling means, in this case being equal to a substrate carrier 12 able to move each substrate 2 from magazine unit 75" to the laser's cutting point 311, drive the cutting contour during laser cutting and reposition the processed substrate back into an unloading position, schematically illustrated in FIG. 5 by means of a double-arrow for extracting and positioning each loading tray 71" on or in the substrate carrier 12, such that the substrate 2 is arranged in between the two extraction components 61, 62 in a way such that the laser beam 31 can pass through the central openings 611, 621 in order for the laser beam 31 of the laser device 3 being able to cut the substrate 2 provided in the loading tray 71" in the cutting point 311. Furthermore, the container 5 is again provided inside the opening 621 of the lower extraction component 62; however, in the present embodiment, the container 5 is additionally held by a container guiding means 41'. Also, there are several different containers 5 provided inside the system 1', in accordance with the number of dried fluid samples to be analyzed and provided on the substrates 2 in the loading trays 71", which containers 5 are received inside several recesses of a modified container holder 4' in the form of a container rack or tube rack, wherein each container 5 can be positioned automatically inside the central opening 621 of the lower extraction component 62 by means of a lifting component 42 in the form of a so-called container elevator or tube elevator for elevating the respective container 5 from its recess in the container holder 4' through an opening in the container guiding mans 41' and through the opening in the lower extraction component 62 in order to be positioned below the cutting point 311 for receiving the cut area cut from the substrate 2 by the laser beam 31. Accordingly, the lifting component 42' pushes each container 5 out of the respective recess provided in the container holder 4', which is then pushed through the container guiding means 41' and positioned in alignment with the opening 621 of the lower extraction component 62. Afterwards, i.e. after receiving the cut area or at least a sufficient amount of the cut area, the container 5 is moved back to its respective recess inside the container holder 4', and the container holder 4' is moved in a horizontal direction—see the arrow directed to the right in FIG. 5—until the next container 5 is positioned such that it can be pushed upwards into the central opening 621 of the lower extraction component 62 in order to receive another cut area. This is done until each container 5 in the container holder 4' has received the desired cut area, or the desired amount of respective cut area of the substrate 2, and the container holder 4' can be moved further to respective analyzing equipment, if any, or can be removed/unloaded from the system 1' for further processing.

While the current invention has been described in relation to its preferred embodiments, it is to be understood that this description is for illustrative purposes only. Accordingly, it is intended that the invention be limited only by the scope of the claims appended hereto.

The invention claimed is:

1. A system (1; 1') for processing at least one substrate (2) containing a dried fluid sample (21), the system (1; 1') comprising:
    a support configured to position the substrate (2);
    a laser device (3) for directing a laser beam (31) to the substrate (2), configured to cut at least one area of the substrate (2) containing the dried fluid sample (21) by means of the laser beam (31);
    a container holder (4; 4') configured to hold and position a container (5) for receiving the cut area, the container holder (4; 4') being arranged below the substrate (2); and
    an extraction subsystem (6) for extracting fume or dust, or both fume and dust, generated when laser cutting the substrate (2), and
    wherein the extraction subsystem (6) consists of at least two extraction components (61, 62) sandwiching the substrate (2) there between, wherein the at least two extract components (61, 62) comprises an upper extraction component (61) and a lower extraction component (62), both sandwiching the substrate (2) there between in such a way that the substrate (2) is positioned in between the at least two extraction components (61, 62), wherein the upper extraction component (61) is positioned above the substrate (2), and wherein the lower extraction component (62) is positioned below the substrate.

2. The system (1; 1') of claim 1, wherein the substrate area to be cut is exposed to the laser beam (31).

3. The system (1; 1') of claim 1, wherein the extraction component (61) provided on a laser device (3) facing side of the substrate (2) comprises an opening (611) sized in accordance with a diameter of the laser beam (31).

4. The system (1; 1') of claim 1, wherein the extraction component (62) provided on a side of the substrate (2) not facing the laser device (3) comprises an opening (621) sized to allow the container (5) to pass through.

5. The system (1; 1') of claim 1, wherein the fume or dust, or both the fume and the dust is evacuated from the laser cutting substrate area by extracting the fume or dust, or both the fume and the dust proximate to a laser cutting point (311) on the substrate (2).

6. The system (1; 1') of claim 5, wherein vacuum is applied to the extraction subsystem (6) for extracting the fume or dust, or both the fume and the dust, the vacuum pressure being adapted to extract the fume or dust but to not affect the cut substrate area itself.

7. The system (1; 1') of claim 5, wherein the extracted fume or dust is guided through a filter for absorbing fume or dust, or both fume and dust particles.

8. The system (1; 1') of claim 1, wherein the at least two components (61, 62) of the extraction subsystem (6) are funnels, and more preferably annular extraction funnels with a circular opening (611, 621) at the respective funnel neck, further preferably wherein an extraction flow path passes an annular clearance downstream of the circular opening (611, 621) for generating sufficient homogeneous radial flow.

9. The system (1; 1') of claim 1, wherein the substrate (2) is a dried blood spot (DBS) card (2).

10. The system (1; 1') of claim 1, wherein the system (1; 1') further comprises a loading/unloading subsystem (7) for manually loading/unloading the substrate (2) or the container (5), or for manually loading/unloading both the substrate (2) and the container (5), preferably wherein the loading/unloading system (7) comprises a loading tray (71; 71'; 71") for receiving and tautening the substrate (2), further preferably wherein the loading tray (71'; 71") is adapted to fit into a cassette (75') for holding the substrate (2) separate from other substrates to avoid direct cross-contamination between several substrates.

11. The system (1; 1') of claim 1, wherein the substrate support (12) comprises an x-y positioning stage (9) for positioning or moving, or for both positioning and moving, the substrate (2) relative to the laser device (3).

12. The system (1; 1') of claim 1, wherein the laser device (3) is configured to orient the laser beam (31) relative to the substrate (2).

13. The system (1; 1') of claim 12, wherein
    the laser device (3) is held by a laser device support configured to position or move, or to both position and move, the laser beam (31) relative to the substrate (2) by means of an x-y positioning stage (32),
    the system (1; 1') further comprises means using mirrors for guiding the laser beam relative to the substrate (2), such as a galvo drive or an x-y positioning stage including moving mirrors, or
    the system (1; 1') further comprises fiber optics for guiding the laser beam (31) relative to the substrate (2).

14. The system of claim 1, wherein the system further comprises means for extracting analytes from the dried fluid sample (21) contained in the cut substrate area.

15. The system of claim 1, wherein the system further comprises means for analyzing the cut substrate area, matter present in the cut substrate area, or analytes extracted from the dried fluid sample (21) contained in the cut substrate area.

* * * * *